United States Patent
Gupta et al.

(10) Patent No.: US 6,519,646 B1
(45) Date of Patent: Feb. 11, 2003

(54) METHOD AND APPARATUS FOR ENCODING CONTENT CHARACTERISTICS

(75) Inventors: Amit Gupta, Fremont, CA (US); Elliot Poger, San Francisco, CA (US); Christoph Schuba, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/146,381

(22) Filed: Sep. 1, 1998

(51) Int. Cl.[7] .............................................. G06F 15/16
(52) U.S. Cl. ..................................... 709/229; 709/245
(58) Field of Search ................................. 709/226–229, 709/203–207, 245, 230

(56) References Cited

U.S. PATENT DOCUMENTS

| | | | | |
|---|---|---|---|---|
| 5,835,712 A | * | 11/1998 | DuFresne | 709/203 |
| 5,852,717 A | * | 12/1998 | Bhide et al. | 709/203 |
| 5,862,348 A | * | 1/1999 | Pedersen | 709/229 |
| 5,878,233 A | * | 3/1999 | Schloss | 709/225 |
| 5,896,502 A | * | 4/1999 | Shieh et al. | 709/224 |
| 5,903,732 A | * | 5/1999 | Reed et al. | 709/229 |
| 5,944,781 A | * | 8/1999 | Murray | 709/202 |
| 5,958,053 A | * | 9/1999 | Denker | 713/201 |
| 5,961,601 A | * | 10/1999 | Ivengar | 709/229 |
| 5,963,915 A | * | 10/1999 | Kirsch | 705/26 |
| 5,966,135 A | * | 10/1999 | Roy et al. | 345/433 |
| 5,987,134 A | * | 11/1999 | Shin et al. | 380/25 |
| 5,987,504 A | * | 11/1999 | Toga | 709/206 |
| 5,991,802 A | * | 11/1999 | Allard et al. | 709/200 |
| 5,991,810 A | * | 11/1999 | Shapiro et al. | 709/229 |
| 6,006,332 A | * | 12/1999 | Rabne et al. | 713/201 |
| 6,012,087 A | * | 1/2000 | Freivald et al. | 709/218 |

(List continued on next page.)

FOREIGN PATENT DOCUMENTS

| | | |
|---|---|---|
| EP | 0 695 075 A1 | 1/1996 |
| WO | WO 97/22201 | 6/1997 |
| WO | WO 97/34244 | 9/1997 |

OTHER PUBLICATIONS

Wetherall et al., The Active IP Option, the 7th ACM Sigops European Workshop, 8 pages, Sep. 1996.*

(List continued on next page.)

Primary Examiner—Mehmet B. Geckil
Assistant Examiner—Bunjob Jaroenchonwanit
(74) Attorney, Agent, or Firm—Martine & Penilla, LLP

(57) ABSTRACT

A method and apparatus for encoding characteristics for the retrieval of information. Depending on the characteristics, some methods for retrieving information may be preferred. If information is too large to utilize UDP, then TCP may be preferred. In addition, if information is not cacheable, then it is preferable to retrieve the information directly from the server instead of searching the cache first. A URL (Uniform Resource Locator) is utilized on the internet to specify the application protocol (e.g., http), the domain name (e.g., www.sun.com), and file location (e.g., /users/hcn/index.html). The suffix of a file indicator is utilized to identify how to process the data or information subsequent to retrieval. One or more embodiments of the invention provide for encoding characteristics of data to be transferred that indicates or hints at an optimal method to retrieve the data. For example, the URL may specify that TCP is the preferred transfer protocol, thereby avoiding an attempted transfer using UDP. Additionally, the encoding may specify that the client should preferably retrieve the information directly from the server instead of searching the proxy cache. The characteristics or preferred retrieval method may be encoded in a any portion of a URL. Additionally, one or more embodiments of the invention provide for backwards compatibility with existing internet browsers by encoding the characteristics in the file location portion of the URL instead of the application protocol identifier portion.

27 Claims, 5 Drawing Sheets

U.S. PATENT DOCUMENTS

| | | | | |
|---|---|---|---|---|
| 6,020,885 A | * | 2/2000 | Honda | 345/332 |
| 6,025,837 A | * | 2/2000 | Mathews, III | 345/327 |
| 6,029,175 A | * | 2/2000 | Chow et al. | 707/104 |
| 6,029,200 A | * | 2/2000 | Beckerman et al. | 709/226 |
| 6,038,603 A | * | 3/2000 | Joseph | 709/228 |
| 6,058,373 A | * | 5/2000 | Blinn et al. | 705/26 |
| 6,081,842 A | * | 6/2000 | Sharchar | 709/229 |
| 6,119,167 A | * | 9/2000 | Boyle et al. | 709/234 |
| 6,167,453 A | * | 12/2000 | Becker et al. | 709/245 |

OTHER PUBLICATIONS

U.S. Department of Energy, "1–034:Internet Cookies", ciac.org, Mar. 1998, 6 pages.*

Wright, "HTTP Cookie Library Readme", www.worldwidemart.com, Jul. 1996, 12 pages.*

Berners–Lee et al.,RFC 1738, "Uniform Resource Locators (URL)", ref.fh–koeln.de/rfc/html/rfe1738.html, Dec. 1994, 24 pages.*

C2NET Software, *SafePassage Web Proxy*, {http://www.c2.net/products/spwp▽ (visited Aug. 6, 1998).

ACE Internet, *Web Browser Proxy Settings for Ace Internet*, {http://www.ace.net.au/ace/proxy.htm} (visited Aug. 6, 1998).

University of Minnesota, *Caching Web Proxy*, {http://www.physics.umn.edu/support/www–cache.html} (visited Aug. 6, 1998).

Bob Braden, *RFC–1644 T/TCP—TCP Extensions for Transactions*, Networking Working Group, Jul. 1994.

Cert, *IP Spoofing Attacks and Hijacked Terminal Connections*, CA–95:01, Computer Emergency Response Team, Carnegie Mellon University, Pittsburgh, Pennsylvania, Jan. 1995.

Roy T. Fielding, Jim Gettys, Jeffrey C. Mogul, Henrik Frystyk Nielsen, and Tim Berners–Lee, *RFC–2068 Hypertext Transfer Protocol*—HTTP/1.1, Network Working Group, Jan. 1997.

Steven D. Gribble, *UC Berkeley Home IP HTTP Traces*, Jul. 1997, available at http://www.acm.org/sigcomm/ITA/.

John Heidemann, Katia Obraczka, and Joe Touch, *Modeling the Performance of http Over Several Transport Protocols*, IEEE/ACM Transactions on Networking, Oct. 1997, pp. 616–630, vol. 5, No. 5.

Laurent Joncheray, *A Simple Active Attack Against TCP*, In Proceedings of the $5^{th}$ UNIX Security Symposium, Jun. 1995, pp. 7–19, Salt Lake City, Utah.

Bruce Mah, *An Empirical Model of HTTP Network Traffic*, In Proceedings of Infocom '97, Apr. 1997, pp. 593–600, Kobe, Japan.

Jeffrey Mogul and Steve Deering, *RFC–1191 Path MTU Discovery*, SRI International, Nov. 1990, Menlo Park, California.

B. Clifford Neuman, *The Virtual System Model: A Scalable Approach to Organizing Large Systems*, PhD thesis, 1992, University of Seattle, Washington.

Kedarnath Poduri and Kathleen Nichols, *RFC–2415 Simulation Studies of Increased Initial TCP Window Size*, Network Working Group, Sep. 1998.

Jon Postel, *RFC–768 User Datagram Protocol*, Network Information Center, Aug. 1980.

Jon Postel, *RFC–791 Internet Protocol*, Sep. 1981, Information Science Institute, University of Southern California.

Jon Postel, *RFC–792 Internet Control Message Protocol*, Sep. 1981, Information Sciences Institute, University of Southern California.

Jon Postel, *RFC–793 Transmission Control Protocol*, Sep. 1981, Information Sciences Institute University of Southern California.

Christoph L. Schuba, Ivan V. Krsul, Markus G. Kuhn, Eugene H. Spafford, Aurobindo Sundaram, and Diego Zamboni, *Analysis of a Denial of Service Attack on TCP*, In Proceddings of the Symposium on Security and Privacy, IEEE, May 1997, pp. 208–223, Oakland, California.

Cidon et al., *Hybrid TCP–UDP Transport for Web Traffic*, SML Technical Report Series, Jan. 1999, Sun Microsystems Laboratories, Palo Alto, California.

* cited by examiner

METHOD AND APPARATUS FOR ENCODING CONTENT CHARACTERISTICS

BACKGROUND OF THE INVENTION

1. Field of the Invention

This invention relates to the field of computer software, and, more specifically, to optimizing network traffic.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, Hotjava Views and all Javabased trademarks and logos are trademarks or registered trademarks of Sun Microsystems, Inc. in the United States and other countries.

2. Background Art

In a computer network environment, a computer user (client) may try to obtain a file from a central storage location (server). Existing schemes can waste time looking for the file and can often use an inefficient delivery method to provide the file to the user. These problems can be understood by reviewing networks and how they work.

A. Networks

In modem computing environments, it is commonplace to employ multiple computers or workstations linked together in a network to communicate between, and share data with, network users. A network also may include resources, such as printers, modems, file servers, etc., and may also include services, such as electronic mail. Transferring information across a network may be a time consuming process. The prior art does not provide an efficient manner to optimize the transfer and retrieval of information on a network.

A network can be a small system that is physically connected by cables or via wireless communication (a local area network or "LAN"), or several separate networks can be connected together to form a larger network (a wide area network or "WAN"). Other types of networks include the internet, telcorn networks, the World Wide Web, intranets, extranets, wireless networks, and other networks over which electronic, digital, and/or analog data may be communicated.

The Internet is a client/server system. A "client" is the computer that you use to access the Internet. When you log onto the World Wide Web portion of the Internet, you view "web pages" that are stored on a remote "server" computer. Information including data, files, and the web pages to be viewed are often transferred between the client and the server. Depending on the type of information transferred, the server or client may have to evaluate the information prior to processing. Additionally, one method for transferring the data may be more efficient than another method depending on the type of data being transferred. Some background on the Internet helps provide an understanding of these problems.

The Internet is a worldwide network of interconnected computers. An Internet client accesses a computer on the network via an Internet provider. An Internet provider is an organization that provides a client (e.g., an individual or other organization) with access to the Internet (via analog telephone line or Integrated Services Digital Network line, for example). A client can, for example, download a file from or send an electronic mail message to another computer/client using the Internet. An Intranet is an internal corporate or organizational network that uses many of the same communications protocols as the Internet. The terms Internet, World Wide Web (WWW), and Web as used herein includes the Intranet as well as the Internet.

The components of the WWW include browser software, network links, and servers. The browser software, or browser, is a user-friendly interface (i.e., front-end) that simplifies access to the Internet. A browser allows a client to communicate a request without having to learn a complicated command syntax, for example. A browser typically provides a graphical user interface (GUI) for displaying information and receiving input. Examples of browsers currently available include Netscape Navigator and Internet Explorer.

A browser displays information to a client or user as pages or documents. A language called Hypertext Markup Language (HTML) is used to define the format for a page to be displayed in the browser. A Web page is transmitted to a client as an HTML document. The browser executing at the client parses the document and produces and displays a Web Page based on the information in the HTML document. Consequently, the HTML document defines the Web Page that is rendered at runtime on the browser.

B. Network Communication/Data Transfer

Information servers maintain the information on the WWW and are capable of processing a client request. To enable the computers on a network including the WWW to communicate with each other, a set of standardized rules for exchanging the information between the computers, referred to as a "protocol", is utilized. Transfer Protocols generally specify the data format, timing, sequencing, and error checking of data transmissions. Numerous transfer protocols are used in the networking environment. For example, one family of transfer protocols is referred to as the transmission control protocol/internet protocol ("TCP/IP"). The TCP/IP family of transfer protocols is the set of transfer protocols used on the internet and on many multiplatform networks.

1. Transfer Protocols

The TCP/IP transfer protocol family is made up of numerous individual protocols (e.g., file transfer protocol ("FTP"), transmission control protocol ("TCP"), and network terminal protocol ("TELNET")). The TCP protocol is responsible for breaking up a message to be transmitted into datagrams of manageable size, reassembling the datagrams at the receiving end, resending any datagrams that get lost (or are not transferred), and reordering the data (from the datagrams) in the appropriate order. A datagram is a unit of data or information (also referred to as a packet) that is transferred or passed across the internet. A datagram contains a source and destination address along with the data. The TCP transfer protocol is often utilized to transmit large amounts of information because of its ability to break up the information into datagrams and reassemble the information at the receiving end.

Another transfer protocol that is utilized to control the transfer of information is the user datagram protocol ("UDP"). UDP is designed for applications and data transmissions where sequences of datagrams do not need to be reassembled at the receiving end. UDP does not keep track of what has been transmitted in order to resend a datagram if necessary. Additionally, UDP's header information (information regarding the source and destination and other relevant information) is shorter than the header information utilized in TCP.

2. Application Protocols

To utilize a Transfer Protocol to transfer information, an Application Protocol that defines a set of commands which one machine sends to another is utilized (e.g., commands to specify who the sender of the message is, who it is being sent to, and the text of the message). The Transfer Protocol (e.g., TCP or UDP) is utilized to ensure that the Application Protocol commands are completely transmitted to the receiving end. HyperText Transfer Protocol (HTTP) is the standard application protocol for communication with an information server on the WWW. HTTP has communication methods that allow clients to request data from a server and send information to the server.

To submit a request, the client contacts the HTTP server and transmits the request to the HTTP server. The request contains the communication method requested for the transaction (e.g., GET an object from the server or POST data to an object on the server). The HTTP server responds to the client by sending a status of the request and the requested information. The connection is then terminated between the client and the HTTP server.

A client request therefore, consists of establishing a connection between the client and the HTTP server, performing the request, and terminating the connection. The HTTP server does not need to maintain any state about the connection once it has been terminated. HTTP is, therefore, a stateless application protocol. That is, a client can make several requests of an HTTP server, but each individual request is treated independent of any other request. The server has no recollection of any previous request. The server does not need to retain state from a prior request.

3. Proxies

Instead of transmitting the information from the server that maintains the information, some systems utilize what is referred to as a proxy. Referring to FIG. 1, a proxy 102 is a server that carries out requests transmitted to it (i.e., from client 100), keeping copies of fetched documents or information for some time so that they can be accessed more quickly in the future, speeding up access for commonly requested information. This maintaining of information and fetched documents by the proxy 102 is referred to as caching and the information maintained in the proxy 102 is referred to as a cache or proxy cache.

A proxy 102 may be viewed as an intermediary between the server 104 and client 100. Referring to FIG. 1 and FIG. 2, at step 202, the client 100 requests information. At step 204, the request is forwarded to the proxy 102. At step 206, the client 100 first checks the proxy cache to see if the relevant information is maintained by the proxy 102. If the proxy cache contains the information, the client 100 does not need to contact the server 104 and loads the information directly from the proxy 102 at step 208. Alternatively, if the proxy cache does not contain the relevant information, the request is forwarded to the server 104 at step 210. At step 212, the client 100 retrieves the information from the server 104. When http is the protocol that is being transmitted over the internet protocol, the proxy 102 is referred to as a web proxy.

To protect information in internal computer networks from external access, a firewall is utilized. A firewall is a mechanism that blocks access between the client and the server. To provide limited access to information, a proxy or proxy server may sit atop a firewall and act as a conduit, providing a specific connection for each network connection. Proxy software retains the ability to communicate with external sources, yet is trusted to communicate with the internal network. For example, proxy software may require a username and password to access certain sections of the internal network and completely block other sections from any external access.

C. Addressing Scheme and Client/Server Data Retrieval

An addressing scheme is employed to identify Internet resources (e.g., HTTP server, file or program). This addressing scheme is called Uniform Resource Locator (URL). A URL may contain the application protocol to use when accessing the server (e.g., HTTP), the Internet domain name (also referred to as the server host name) of the site on which the server is running, the port number of the server (the port number may not be specified in the URL but obtained by translating the server host name), and the location of the resource in the file structure of the server. For example, the URL "http://www.sunlabs.com/research/hsn/index.html" specifies the application protocol ("http"), the server host name ("www.sunlabs.com"), and the filename to be retrieved ("/research/hsn/index.html").

If the client request is for a file, the HTTP server locates the file and sends it to the client. An HTTP server also has the ability to delegate work to Common Gateway Interface (CGI) programs. The CGI specification defines the mechanisms by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data, generates an HTML document, and returns the HTML document as its response to the server using CGI (via standard input, for example). The server forwards the HTML document to the client using the HTTP.

Once files have been retrieved, the client may utilize or process the file. For example, if a HTML document is retrieved, a client's web browser may parse the HTML document and display the document. Depending on the type of file retrieved, the client may activate an application to process the file. For example, if a word processing document is retrieved, the client may activate a word processor to process the document. Alternatively, if an image file is retrieved, an image viewer may be activated to process and display the image.

To identify the type of file that is retrieved so that the client may know how to process the file subsequent to retrieval, a file suffix or extension may be utilized. A file extension or suffix often consists of a period "." and several letters that are attached to the end of a file name. For example, an HTML document may end with the suffix ".htm" or ".html" (e.g., "index.html" or "home.html"), a word processing document filename may end with the suffix ".doc" (e.g., "report.doc" or "letter.doc"), a JPEG (Joint Photographic Experts Group) image filename may end with the suffix ".jpg" (e.g., "image.jpg" or "picture.jpg"), and a postscript document (document created in the postscript page description language) may end with the suffix ".ps" (e.g., "calendar.ps" or "font.ps").

Upon receiving a file, the client browser will typically examine the extension to determine how to process the file after receipt (e.g., launch an application program to process the file).

The above described methods are slow and inefficient in retrieving a file from the client or server. For example, with a web proxy, the client first searches the web proxy cache for the relevant web pages or information and if not present then processes the request with the server requiring a second search. Additionally, although it may be more efficient to utilize a UDP transfer protocol instead of TCP (i.e., for smaller files), this is not done. Referring to FIG. 3, the prior art first attempts to transfer information using UDP at step 302. At step 304, a determination is made regarding whether UDP was acceptable and was utilized to transmit the requested information. If the transfer attempt failed and UDP was not acceptable, the web browser will attempt the transfer using TCP at step 306. (Repetitively attempting a transfer with an improper transfer protocol creates a large overhead. Further, the prior art does not provide for an efficient method to optimize the retrieval of a file or information from a server or client). If the transfer using UDP is acceptable, the transfer proceeds using UDP at step 309.

SUMMARY OF THE INVENTION

A method and apparatus for encoding characteristics for the retrieval of information. In a network of computers, clients and servers communicate and exchange data and information. Depending on characteristics of the data or information, certain methods for exchanging or retrieving the information may be preferred. For example, if the information is too large to utilize a UDP (User Datagram Protocol) transfer protocol, then the TCP (Transmission Control Protocol) transfer protocol may be preferred. In addition, if the information is not cacheable, then it is preferable to retrieve the information directly from the server instead of searching the cache first.

A URL (Uniform Resource Locator) is utilized on the internet to specify the application protocol (e.g., http), the domain name (e.g., www.sun.com), and file location (e.g., /users/hcn/index.html). The suffix of a file indicator is utilized to identify how to process the data or information subsequent to retrieval.

One or more embodiments of the invention provide for encoding characteristics of data to be transferred that indicates or hints at an optimal method to retrieve the data. For example, the URL may specify that TCP is the preferred transfer protocol, thereby avoiding an attempted transfer using UDP. Additionally, the encoding may specify that the data is not cacheable so that the client may retrieve the information directly from the server instead of searching the proxy cache. This encoded information may be published by the server and parsed by the client prior to executing data retrieval. Thus, the client may retrieve the data efficiently, decreasing the overhead utilized influencing the behavior of the data transfer over a network.

The characteristics or preferred retrieval method may be encoded in a any portion of a URL. Additionally, one or more embodiments of the invention provide for backwards compatibility with existing internet browsers by encoding the characteristics in the file location portion of the URL instead of the application protocol identifier portion.

DETAILED DESCRIPTION OF THE INVENTION

The invention is a method and apparatus for encoding content characteristics. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 4:
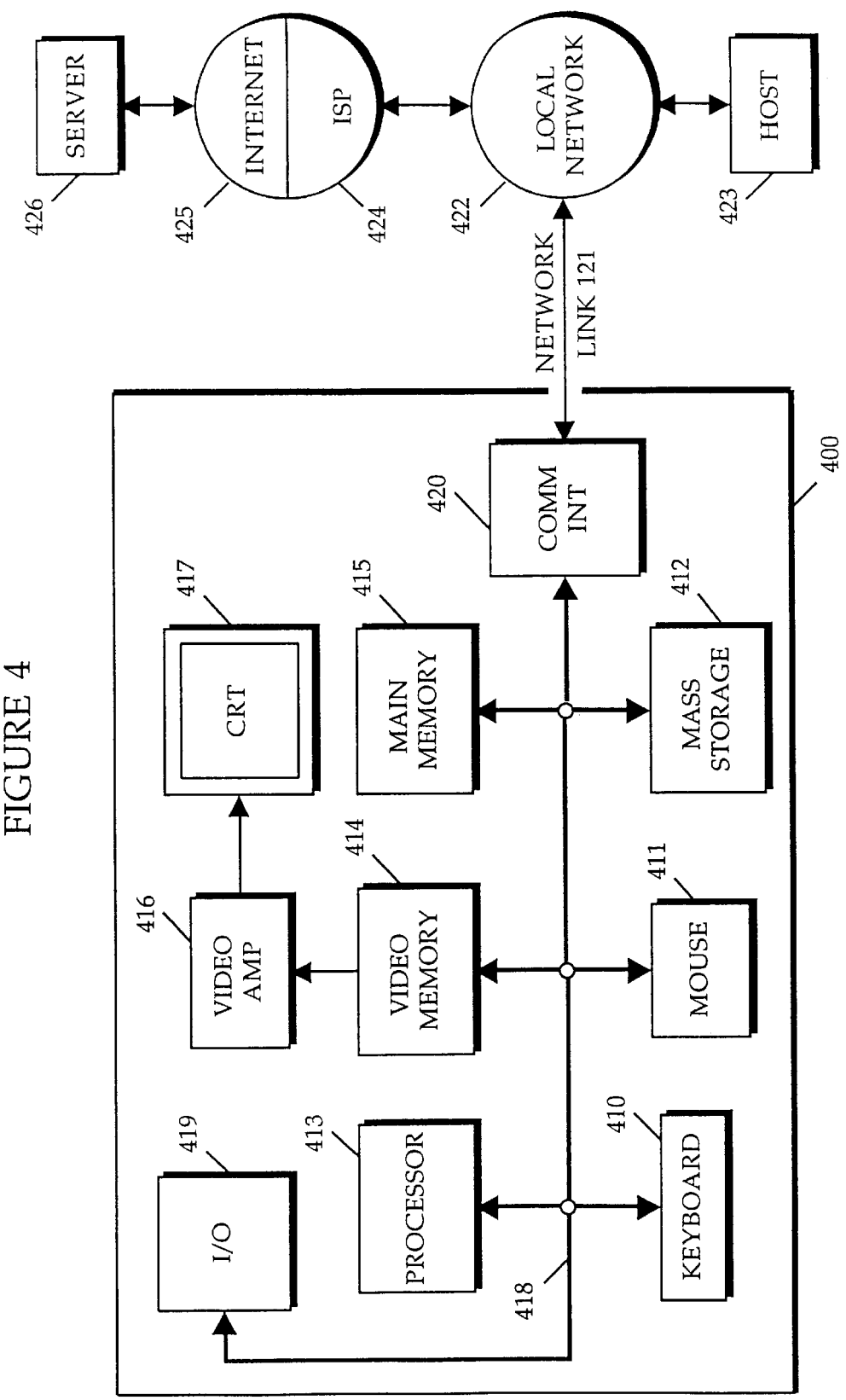
FIG. 4 is a block diagram of one embodiment of a computer system capable of providing a suitable execution environment for one or more embodiments of the invention.

An embodiment of the invention can be implemented as computer software in the form of computer readable code executed on a general purpose computer such as computer 400 illustrated in FIG. 4, or in the form of bytecode class files running on such a computer. A keyboard 410 and mouse 411 are coupled to a bidirectional system bus 418. The keyboard and mouse are for introducing user input to the computer system and communicating that user input to processor 413. Other suitable input devices may be used in addition to, or in place of, the mouse 411 and keyboard 410. I/O (input/output) unit 419 coupled to bidirectional system bus 418 represents such I/O elements as a printer, A/V (audio/video) I/O, etc.

Computer 400 includes a video memory 414, main memory 415 and mass storage 412, all coupled to bidirectional system bus 418 along with keyboard 410, mouse 411 and processor 413. The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 32-bit data bus for transferring data between and among the components, such as processor 413, main memory 415, video memory 414 and mass storage 412. Alternatively, multiplex data/address lines may be used instead of separate data and address lines.

In one embodiment of the invention, the processor 413 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

Computer 400 may also include a communication interface 420 coupled to bus 418. Communication interface 420 provides a two-way data communication coupling via a network link 421 to a local network 422. For example, if communication interface 420 is an integrated services digital network (ISDN) card or a modem, communication interface 420 provides a data communication connection to the corresponding type of telephone line, which comprises part of network link 421. If communication interface 420 is a local area network (LAN) card, communication interface 420 provides a data communication connection via network link 421 to a compatible LAN. Wireless links are also possible.

In any such implementation, communication interface 420 sends and receives electrical, electromagnetic or optical signals which carry digital data streams representing various types of information.

Network link 421 typically provides data communication through one or more networks to other data devices. For example, network link 421 may provide a connection through local network 422 to local server computer 423 or to data equipment operated by an Internet Service Provider (ISP) 124. ISP 424 in turn provides data communication services through the world wide packet data communication network now commonly referred to as the "Internet" 425. Local network 422 and Internet 425 both use electrical, electromagnetic or optical signals which carry digital data streams. The signals through the various networks and the signals on network link 421 and through communication interface 420, which carry the digital data to and from computer 400, are exemplary forms of carrier waves transporting the information.

Computer 400 can send messages and receive data, including program code, through the network(s), network link 421, and communication interface 420. In the Internet example, remote server computer 426 might transmit a requested code for an application program through Internet 425, ISP 424, local network 422 and communication interface 420. In accord with the invention, one such application is that of remotely configuring a computer.

The received code may be executed by processor 413 as it is received, and/or stored in mass storage 412, or other non-volatile storage for later execution. In this manner, computer 400 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Embodiment of Software Apparatus for Encoding Content Characteristics

In one or more embodiments of the invention, a variety of facts or hints are encoded into URLs to enable client side optimizations as well as optimizations at intermediate processing points, such as proxy caches or application layer firewalls. The facts or hints are characteristics of the data that is to be transferred that allow for optimization in the retrieval of the information from the server thereby influencing the transfer of information across a network. Further, the facts or hints may be encoded into any part of a URL.

Figure 5:
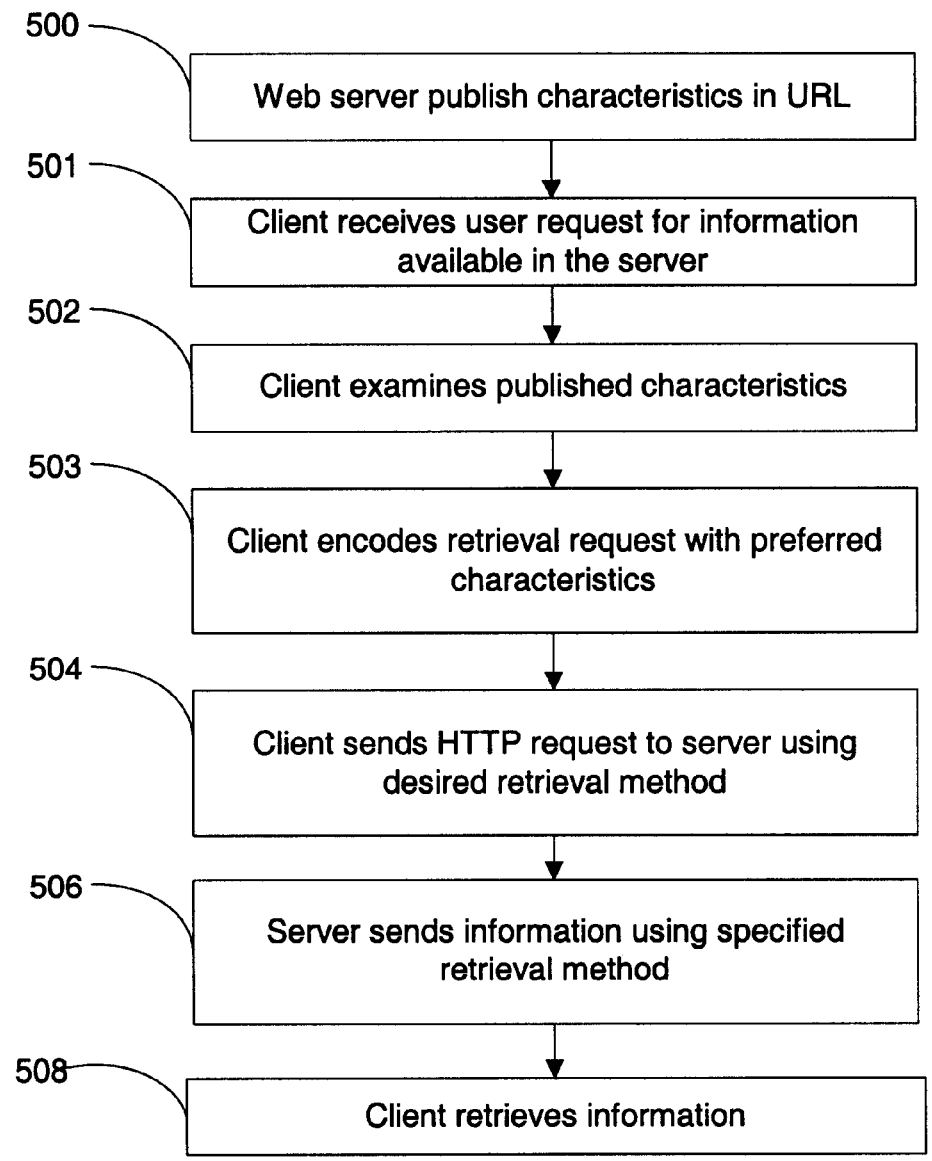
FIG. 5 demonstrates a method for the encoding and use of information in URLs according to one or more embodiments of the invention.

FIG. 5 demonstrates a method for the encoding and use of information in URLs according to one or more embodiments of the invention. A server has knowledge about the details and characteristics of the information and files the server maintains (e.g., the length of the file, or the fact that the file is cacheable). Such information and characteristics are known by the server prior to a file being requested by a client. At step 500, the server or web server may publish one or more of the characteristics regarding the file or transfer of the file in the URL for the file. At step 501, the client receives a request from a user for information available on the web server. Such a publication may be a universal convention that applies across all clients and servers. Alternatively, the server may provide the encoded information to the clients in a manner that is similar to the way servers provide cookies (a small piece of information that can later be read back from a browser) to a client or browser. For example, when a server first responds to a client's request, the server may include an additional (and optional) field in the reply that informs the client about the various retrieval methods and how such information is encoded (referred to as retrieval identifier). When future information is encoded with a retrieval identifier, the client maintains the knowledge regarding the meaning of the retrieval identifier and how to retrieve the encoded information. For example, a single retrieval identifier statement would include the following information:

<property><pattern><applicable host domain><lifetime> where, the property field may be "not-cacheable" or "TCP-only"; the pattern field may contain "*-nc-*"; the applicable host domain field may be "*.sun.com"; and the lifetime field is an optional field that informs the clients when this information expires.

At step 502, the client views and examines the published characteristics or transmitted information and encodes the desired retrieval characteristics onto the retrieval request. At step 504, the client transmits the request to the server (using an application protocol, e.g., HTTP). The client request uses the desired retrieval method. The retrieval method may consist of the transfer protocol (i.e., TCP or UDP) or it may consist of caching information (i.e., whether the information being transmitted is cacheable or not). At step 506, the server transmits the information to the client using the specified retrieval method. At step 508, the client receives the information and processes it as desired. The post-transfer processing may consist of initializing an application program to read or display the file.

Step 500 of FIG. 5 demonstrates the encoding aspects of the present invention. By encoding retrieval or file characteristics in the URL, the client may optimize the retrieval of the information. Some examples of the hints or characteristics that can be encoded are "Don't use UDP", "Please use UDP", "Don't use TCP", "Please use TCP", "Do not cache", "Cache if possible", or "Don't retrieve file from proxy". These messages may be encoded in any portion of the URL.

Figure 3:
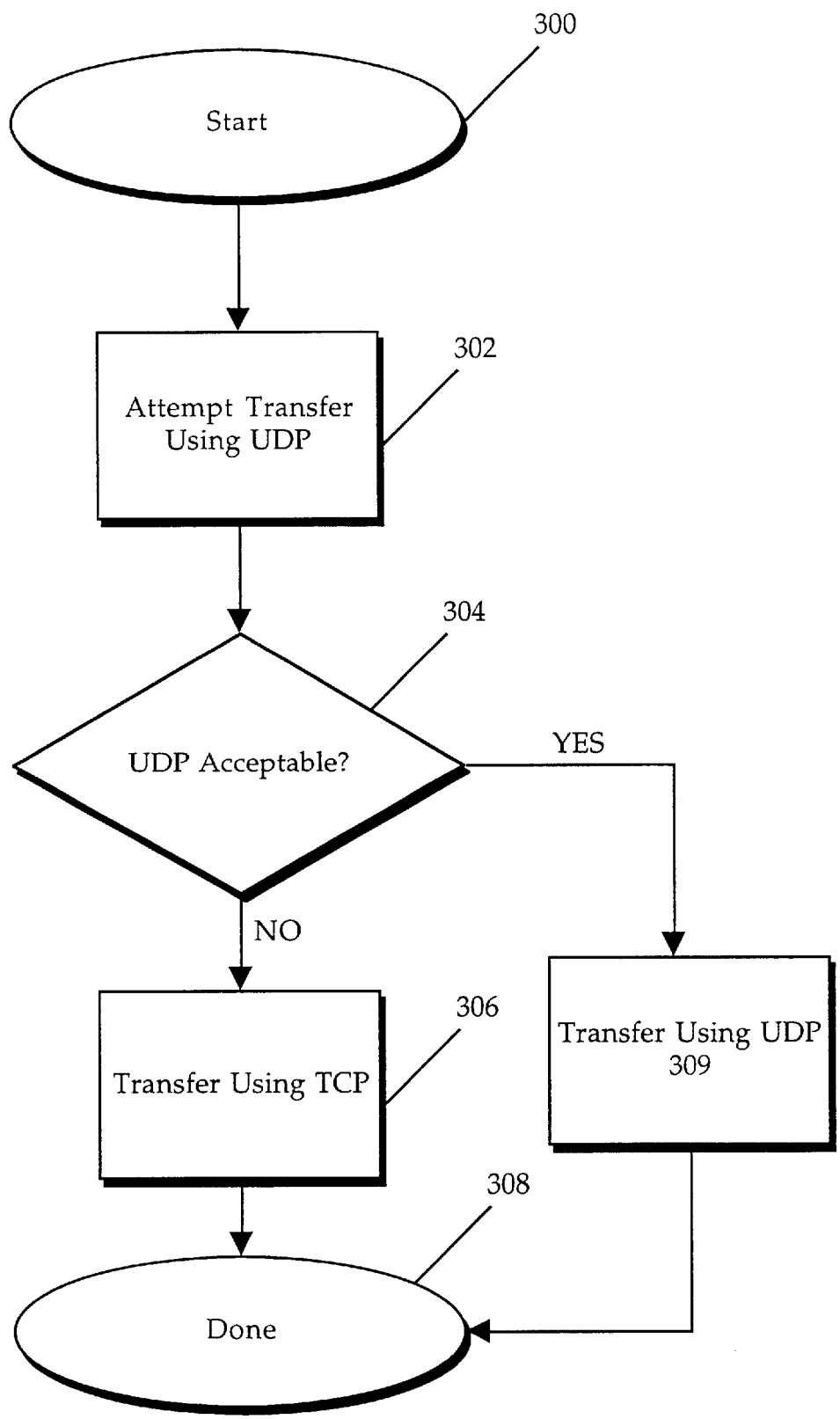
FIG. 3 demonstrates a prior art method for retrieving information using TCP or UDP.

For example, referring to FIG. 3, if the URL specifies that TCP is preferred, the client will not attempt file retrieval using UDP first (steps 302–304), saving on the wasted overhead of a failed UDP transfer attempt. Instead, the client will retrieve the information using TCP at step 306 without a failed transfer attempt, eliminating steps 302–304.

Figure 1:
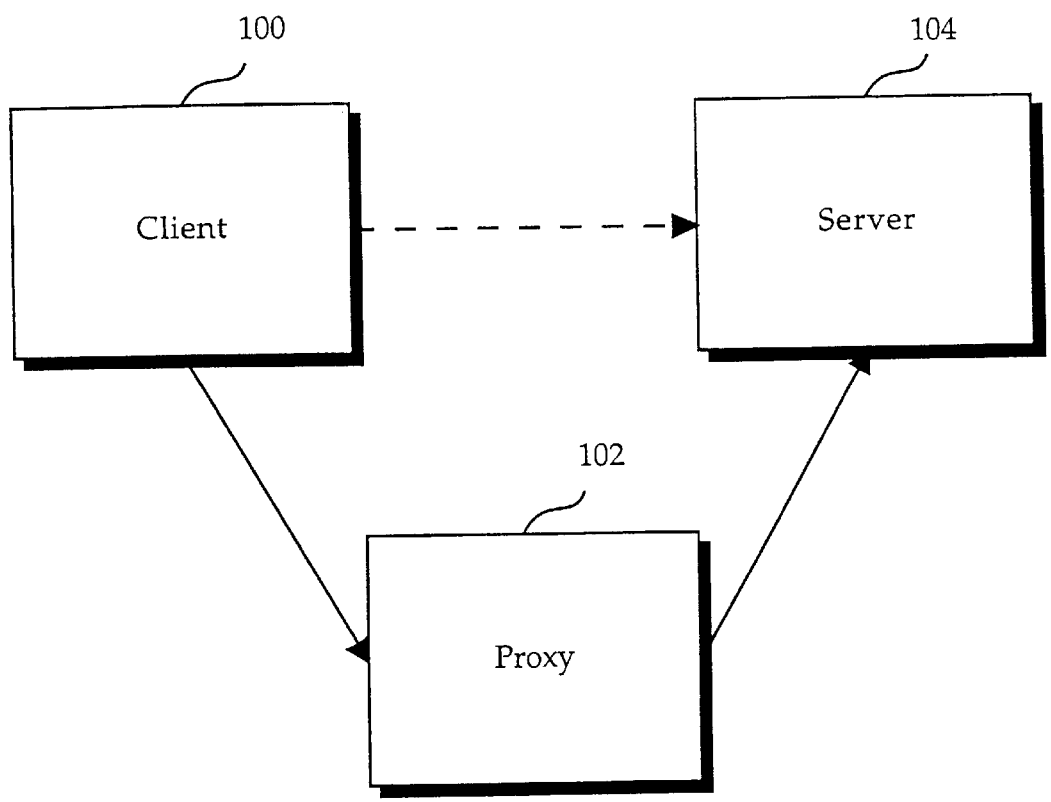
FIG. 1 illustrates the client, server, and proxy relationship.
Figure 2:
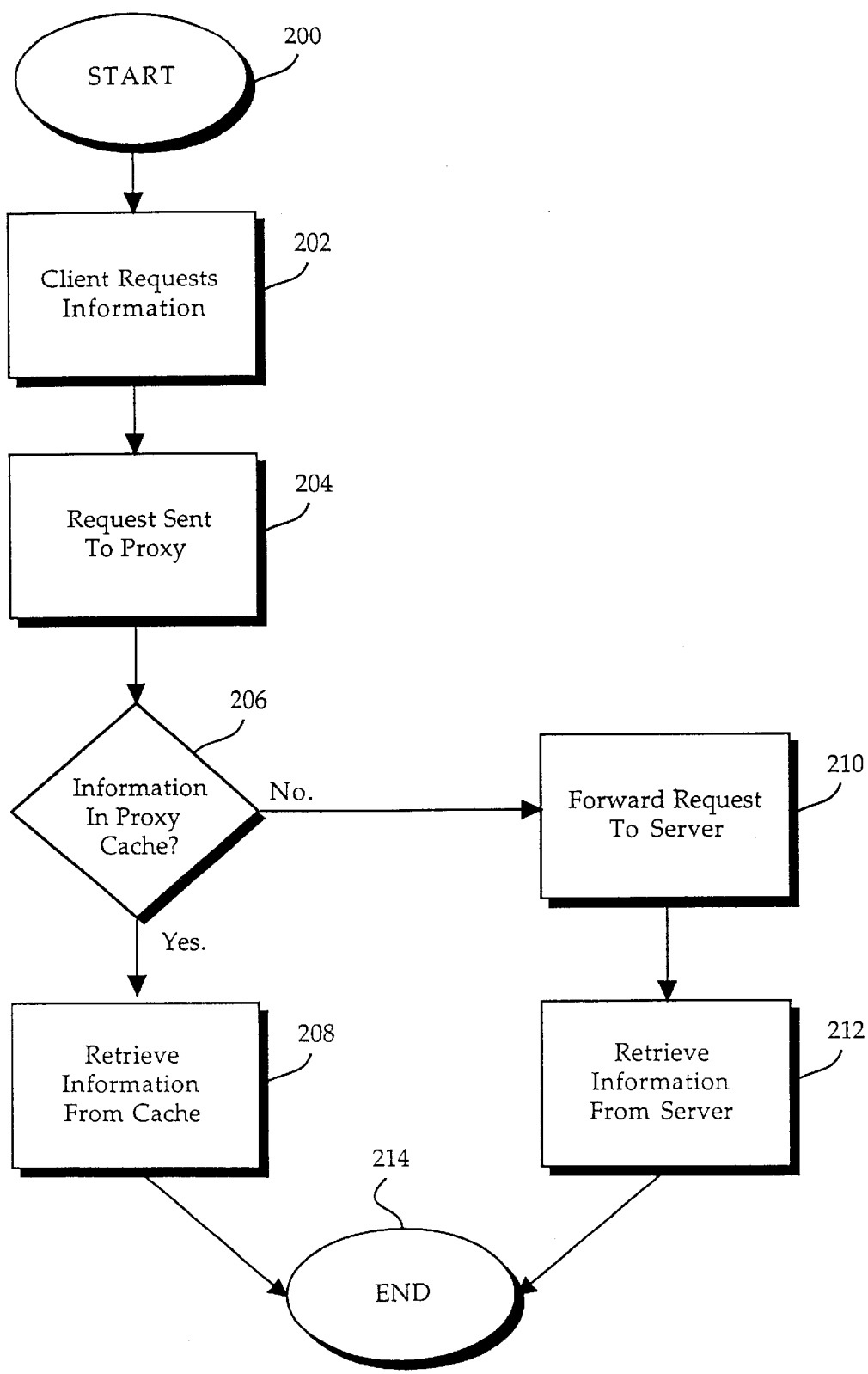
FIG. 2 demonstrates a prior art method for retrieving information with a proxy.

Referring to FIG. 2, if the URL specifies that the information is not cacheable or is not in cache, the client web browser will go directly to the server to retrieve the information at step 212 instead of performing a cache lookup on the web proxy first eliminating steps 204–210. By retrieving the information directly from the server, the latency for repeat requests is reduced, the traffic in the network is reduced, and the load on the proxies is reduced.

Thus, the URL is encoded with characteristics that will optimize the retrieval of files. According to one or more embodiments, the protocol identifier can be supplemented with the desired characteristic/retrieval method. For example, to specify that UDP is the preferable transfer protocol, the URL may be "HTTP/UDP" instead of merely "HTTP", or to specify that the information is cacheable, the URL may be "HTTP/C". However, web browsers may not be configured to process arbitrary data such as a preferred retrieval method in the application protocol identifier portion of a URL. Thus, users of prior art web browsers will be unable to process any URLs that have such data in the application protocol identifier portion of the URL. The ability to use an old web browser with a new data format is referred to as backwards compatibility.

To maintain backwards compatibility while providing the desired characteristics in the URL, one or more embodiments of the invention encode the characteristics in the Internet domain name or resource server location portion of the URL. For example, in one or more embodiments, the suffix of the resource server location portion may be supplemented with additional characters to indicate the retrieval method. In such an embodiment, the file suffix "htmlt" in the URL "http://www.sunlabs.com/research/hsn/index.htmlt" may indicate that TCP is the preferable transfer protocol to utilize for the file transfer. Similarly, the file suffix "htmlu" in the URL "http://www.sunlabs.com/research/hsn/index.htmlu" may indicate that UDP is the preferable transfer protocol to utilize for the file transfer. Alternatively, the suffix of the URL could also be supplemented to indicate whether the information is cacheable or is maintained in the proxy cache. For example, the file suffix "htmlunc" in the URL "http://www.sunlabs.com/research/hsn/index.htmlunc" may indicate that UDP is the preferable transfer protocol and the information is not cacheable. Any other interesting information may be encoded as well, such as the lifetime (for how long it is cacheable).

One or more embodiments of the invention may provide for the retrieval characteristics to be encoded in the domain name or resource server location portion or the URL and hide that information from display in the web browser. Such information may be passed in the form of a parameter in HTML. For example, the file suffix "html?u" in the URL "http://www.sunlabs.com/research/hsn/index.html?u" passes the parameter "u" indicating a UDP transfer.

By encoding the information in the file information or resource server location portion of a URL, with several pages based in the same server, some pages may be retrieved in one manner (e.g., from the proxy server or using UDP), while other pages may be retrieved in another manner (e.g., directly from the server or using TCP). Further, by encoding information in the URL prior to retrieving the information, the actual transmission of the file or information to the client may be optimized. Once the file is retrieved in an optimized manner by the client, it can then be processed according to the methods of the prior art (i.e., by invoking an image viewer, word processor, or HTML document browser to process the retrieved information).

Thus, a method and apparatus for encoding content characteristics for the retrieval of information is described in conjunction with one or more specific embodiments. The invention is defined by the claims and their full scope of equivalents.

What is claimed is:

1. A method for retrieving information comprising:
   publishing at least one retrieval characteristic of a server, to a client, wherein said publishing is by said server, said at least one retrieval characteristic defining a retrieval method and a retrieval request format;
   receiving an encoded retrieval request for information on said server from said client, said encoded retrieval request being formatted according to said retrieval request format and said encoded retrieval request using said retrieval method;
   obtaining said at least one retrieval characteristic from said encoded retrieval request prior to retrieval of said information on said server; and
   sending said information from said server to said client by using said retrieval method defined by said encoded retrieval request;
   wherein said retrieval request is a URL.

2. The method of claim 1 wherein said at least one retrieval characteristic comprises an indicator to utilize TCP as a transfer protocol.

3. The method of claim 1 wherein said at least one retrieval characteristic comprises an indicator to utilize UDP as a transfer protocol.

4. The method of claim 1 wherein said at least one retrieval characteristic comprises an indicator regarding whether said information should be obtained directly from said server.

5. The method of claim 1 wherein said at least one retrieval characteristic is encoded in a file portion of said URL.

6. The method of claim 1 wherein said at least one retrieval characteristic is encoded in a domain name portion of said URL.

7. The method of claim 1 wherein said information is retrieved from said server by a client on a computer network.

8. The method of claim 1 wherein said publishing at least one retrieval characteristic is prior to retrieval of said information.

9. The method of claim 1 wherein said method for obtaining said at least one retrieval characteristic comprises:
   transmitting encoding information, said encoding information defining encoded information regarding one or more retrieval characteristics;
   transmitting one or more retrieval characteristics in the form of encoding information for said information to be retrieved prior to retrieval of said information.

10. A system comprising
    a processor;
    a memory coupled to said processor;
    code executed by said processor configured to retrieve information from a server;
    said code comprising:
      a method of publishing at lease one retrieval characteristic of said server to a client, wherein said publishing is by said server, said at least one retrieval characteristic defining a retrieval method and a retrieval request format;
      a method of receiving an encoded retrieval request for information on said server from said client, said encoded retrieval request being formatted according to said retrieval request format and said encoded retrieval request using said retrieval method;
      a method of obtaining said at least one retrieval characteristic from said encoded retrieval request prior to retrieval of said information; and
      a method of sending said information from said server to said client by using said retrieval method defined by said encoded retrieval request;
      wherein said retrieval request is a URL.

11. The system of claim 10 wherein said at least one retrieval characteristic comprises an indicator to utilize TCP as a transfer protocol.

12. The system of claim 10 wherein said at least one retrieval characteristic comprises an indicator to utilize UDP as a transfer protocol.

13. The system of claim 10 wherein said at least one retrieval characteristic comprises an indicator regarding whether said information should be obtained directly from the server.

14. The system of claim 10 wherein said at least one retrieval characteristic is encoded in a file portion of said URL.

15. The system of claim 10 wherein said at least one retrieval characteristic is encoded in a domain name portion of said URL.

16. The system of claim 10 wherein said code is executed on a computer network and said information is retrieved from said server by a client.

17. The system of claim 10 wherein said code for a method obtaining said at least one retrieval characteristic comprises a method publishing said at least one retrieval characteristic prior to retrieval of said information.

18. The system of claim 10 wherein said code for a method obtaining said at least one retrieval characteristic comprises:

a method transmitting encoding information, said encoding information defining encoded information regarding one or more retrieval characteristics;

a method transmitting one or more retrieval characteristics in the form of encoding information for said information to be retrieved prior to retrieval of said information.

19. A computer program product comprising:

a computer usable medium having computer readable program code embodied therein configured to retrieved information from a network server, said computer program product comprising:

computer readable code configured to cause a computer to publish at least one retrieval characteristic if said server to a client, wherein said publishing is by said server, said at least one retrieval characteristic defining a retrieval method and a retrieval request format;

computer readable code configured to cause a computer to receive an encoded retrieval request for information on said server from said client, said encoded retrieval request being formatted according to said retrieval request format and said encoded retrieval request using said retrieval method;

computer readable code configured to cause a computer to obtain said at least one retrieval characteristic from said encoded retrieval request prior to retrieval of said information; and computer readable code configured to cause a computer to send said information from said server to said client by using said retrieval method defined by said encoded retrieval request;

wherein said retrieval request is a URL.

20. The computer program product of claim 19 wherein said at least one retrieval characteristic comprises an indicator to utilize TCP as a transfer protocol.

21. The computer program product of claim 19 wherein said at least one retrieval characteristic comprises an indicator to utilize UDP as a transfer protocol.

22. The computer program product of claim 19 wherein said at least one retrieval characteristic comprises an indicator regarding whether said information should be obtained directly from said server.

23. The computer program product of claim 19 wherein said at least one retrieval characteristic is encoded in a file portion of said URL.

24. The computer program product of claim 19 wherein said at least one retrieval characteristic is encoded in a domain name portion of said URL.

25. The computer program product of claim 19 wherein said information is retrieved from said server by a client on a computer network.

26. The computer program product of claim 19 wherein said computer readable program code to obtain said at least one retrieval characteristic comprises computer readable program code configured to cause a computer to publish said at least one retrieval characteristic prior to retrieval of said information.

27. The computer program product of claim 19 wherein said computer readable program code to obtain said at least one retrieval characteristic comprises:

computer readable program code configured to cause a computer to transmit encoding information, said encoding information defining encoded information regarding one or more retrieval characteristics;

computer readable program code configured to cause a computer to transmit one or more retrieval characteristics in the form of encoding information for said information to be retrieved prior to retrieval of said information.

\* \* \* \* \*